United States Patent [19]
Yanagawa

[11] Patent Number: 5,465,245
[45] Date of Patent: Nov. 7, 1995

[54] OPTICAL PICKUP CONTROL SYSTEM FOR AN OPTICAL DISC HAVING RECORDED AND NON-RECORDED AREAS

[75] Inventor: Naoharu Yanagawa, Saitama, Japan

[73] Assignee: Pioneer Electronic Corporation, Tokyo, Japan

[21] Appl. No.: 246,923

[22] Filed: May 20, 1994

Related U.S. Application Data

[63] Continuation of Ser. No. 921,038, Jul. 29, 1992, abandoned.

[30] Foreign Application Priority Data

Feb. 21, 1992 [JP] Japan ................... 4-072293

[51] Int. Cl.[6] ........................................ G11B 7/00
[52] U.S. Cl. ................ 369/58; 369/54; 369/44.25
[58] Field of Search ........................ 369/54, 58, 53, 369/47, 48, 49, 32, 44.25, 124

[56] References Cited

U.S. PATENT DOCUMENTS

| | | | |
|---|---|---|---|
| 5,003,521 | 3/1991 | Yoshida et al. | 369/54 |
| 5,053,898 | 10/1991 | Hashimoto et al. | 369/58 |
| 5,081,616 | 1/1992 | Kitahara et al. | 369/47 |
| 5,130,967 | 7/1992 | Tanaka et al. | 369/53 |
| 5,153,866 | 10/1992 | Satoh et al. | 369/58 |

FOREIGN PATENT DOCUMENTS 176185  4/1986  European Pat. Off. .

*Primary Examiner*—Georgia Y. Epps
*Assistant Examiner*—Muhammad N. Edun
*Attorney, Agent, or Firm*—Nikaido, Marmelstein, Murray & Oram

[57] ABSTRACT

An optical pickup control system has an optical pickup for reproducing information recorded on an optical disc, a memory storing data on the position of a recorded area of the information and on the position of an unrecorded area of the disc. A control device is provided for controlling the pickup based on the data stored in the memory and stopping radial movement of the pickup on the disc when the pickup reaches the unrecorded area.

2 Claims, 3 Drawing Sheets

OPTICAL PICKUP CONTROL SYSTEM FOR AN OPTICAL DISC HAVING RECORDED AND NON-RECORDED AREAS

This application is a continuation of application Ser. No. 07/921,038 filed Jul. 29, 1992, now abandoned.

FIELD OF THE INVENTION

The present invention relates to an optical pickup control system of an optical disc player, and more particularly to a system for controlling a pickup head of the pickup when reproducing information on an optical disc.

BACKGROUND OF THE INVENTION

There are optical discs such as a CD including a read only CD and a writable CD-R disc which is used as a ROM. Further, as a writable optical disc having a high recording density, a write once disc and an erasable disc are provided. Information is recorded on the disc and reproduced with a laser beam. These discs are different from the CD in the material of the recording surface.

For example, the write once disc has a tellurium or bismuth recording surface on which the lasers burn pits for recording. In another type of the write once disks, the lasers are focused on a recording surface coated with a selenium antimony ($Sb_2Se_3$) thin film, or an oxide tellurium (TeOx) thin film, or a thin film of organic pigment, changing the reflectivity of the light.

The erasable disc uses as the recording surface, an amorphous alloy made of rare earth metals such as gallium, terbium, and others. In a magneto-optical recording method, the recording surface of the disc is initially magnetized to form a magnetic field in a direction perpendicular to the surface. The laser heats a predetermined area of the disc to elevate the temperature above Curie temperature, which is about 150° C., thereby reversing the direction of the magnetic field. To read the recorded information, the laser is irradiated on the recording surface so that polarized wave front slightly rotates as a result of the Kerr effect. Thus only the polarized wave deflected by the rotation is read by a photodetector, thereby enabling to read the information.

In the write once disc and the erasable disc, an interchange sector or a TOC area is provided for recording information representing a table of contents (TOC) of the recorded information. When reproducing the information on the disc, a pickup head reads the interchange sector or the TOC area to know the position of an unrecorded area. Thus, useless reading of the unrecorded area on the disc can be avoided.

However, in such a disc, since it is necessary to provide a space for the interchange sector or the TOC area, the space for recording the information is reduced to reduce the amount of recording data, which means reduction of the recording density of the disc.

Furthermore, if there is an accidental omission in the recorded information, the pickup head may blindly run without controlling.

SUMMARY OF THE INVENTION

An object of the present invention is to provide optical pickup control system for an optical disc player where a memory is provided for storing data with respect to a recorded area and to an unrecorded area of the disc, thereby increasing the recording density of the disc and improving reliability of the player.

According to the present invention, there is provided an an optical pickup control system comprising an optical pickup for reproducing information recorded on an optical disc, a memory storing data on change of the position of the pickup from a recorded area of the information to an unrecorded area of the disc, detector means for detecting the position of the pickup above the disc and for producing a position signal, determining means for determining that the pickup reaches the unrecorded area based on the position signal and the data stored in the memory and for producing a stop signal, means responsive to the stop signal for stopping radial movement of the pickup.

In an aspect of the invention, the data stored in the memory is a reference value corresponding to the change of the position, the detector means is a photodetector for detecting reflected light from the disc, and the determining means is a comparator for comparing an output of the photodetector with the reference value.

In another aspect, the data stored in the memory is a position of the unrecorded area.

The other objects and features of this invention will become understood from the following description with reference to the accompanying drawings.

DETAILED DESCRIPTION OF THE PREFERRED EMBODIMENTS

Figure 1:
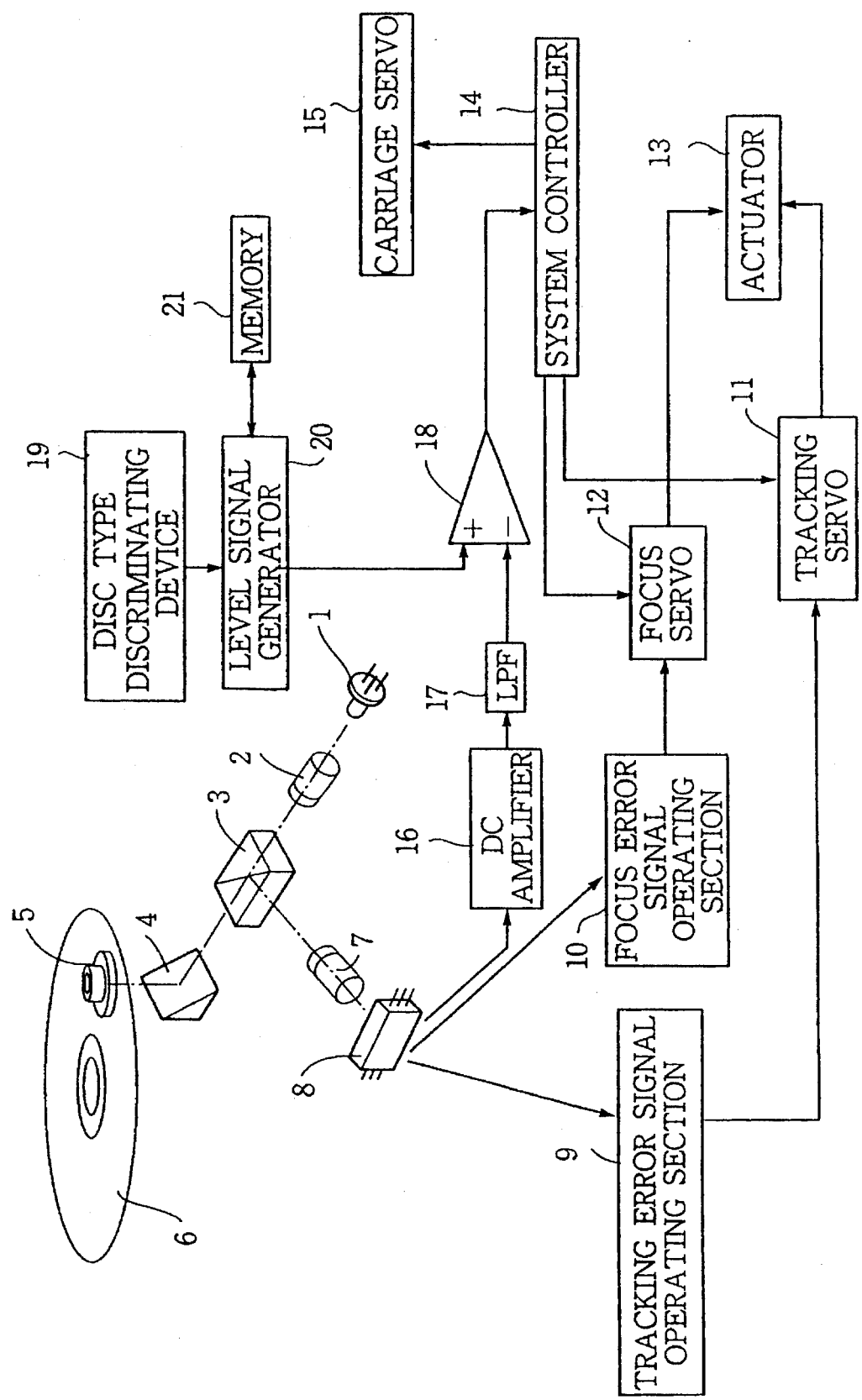
FIG. 1 schematically shows an optical pickup control system according to the present invention.

Referring to FIG. 1 showing an optical system according to the present invention, a laser beam emitted from a semiconductor laser device 1 is paralleled through a collimator lens 2 and fed to a prism 4 passing through a beam splitter 3. The laser beam is reflected on the prism 4 to an optical disc 6 and focused thereon by an objective 5.

The reflected beam from the optical disc 6 is reflected on the prism 4 to the beam splitter 3 where the beam is changed in a perpendicular direction and supplied to a condenser 7. The beam is focused on a photodetector 8 on which divided photo sensors are provided.

The photodetector 8 detects a tracking error and a focus error in accordance with the spot of the beam, and applies detected tracking error and focus error signals to a tracking error signal operating section 9 and a focus error signal operating section 10, respectively. The operating sections 9 and 10 calculate a tracking error and a focus error, and applies the tracking error and the focus error to a tracking servo 11 and a focus servo 12. The tracking servo 11 and the focus servo 12 apply actuating signals to an actuator 13. The actuator 13 operates such that the errors calculated at the operating sections 9 and 10 becomes zero.

A system controller 14 is provided for controlling the tracking servo 11 and the focus servo 12, and a carriage servo 15. The carriage servo 15 is operatively connected to an actuator of a carriage of an optical pickup head for moving the head in the radial direction of the disc 6.

The photodetector 8 further detects reflectivity of the reflected light and applies a reflection signal to a DC amplifier 16. The DC amplifier 16 produces a DC level signal in proportion to the reflectivity which is supplied to an inverting input terminal of a comparator 18 through an LPF (low pass filter) 17.

The optical system further has disc type discriminating device 19 where the type of the disk such as CD, CD-R, write once disc, or erasable disc is discriminated based on an identification code labeled on the disc. There is provided a memory 21 in which reference values for discriminating between the recorded area and the unrecorded area for every type of disc are stored. The reflectivity of the reflected light from the recorded area is larger than that of the unrecorded area, so that the recorded area and the unrecorded area of the loaded disc can be determined in accordance with the reflectivity. Each of the reference values stored in the memory 21 corresponds to a threshold between the reflectivities.

A disc type signal is supplied from the discriminating device 19 to a level signal generator 20. The level signal generator 20 derives a reference value for the loaded disc from the memory 21 in accordance with type signal from the discriminating device 19.

The level signal generator 20 produces a reference DC level signal dependent on the reference value which is supplied to non-inverting input terminal of the comparator 18. The comparator 18 compares the DC level signal from the amplifier 16 with the reference DC level signal from the generator 20. If the output signal of the comparator 18 becomes positive value, it means that the pickup head reaches the unrecorded area of the disc., the system controller 14 operates to stop the operations of the tracking servo 11, focus serve 12, and carriage servo 15 in accordance with the positive signal.

Describing the operation of the optical system, when an optical disc 6 is set in the player, the disc type discriminating device 19 detects the type of the disc 6. The pickup head starts to reproduce the information on the disc. The reflected light from the disc 6 is sensed by the photodetector 8. The DC amplifier 16 produces the DC level signal corresponding to the reflectivity of the reflected light which applied to the comparator 18 through the LPF 17.

On the other hand, the tracking error signal and the focus error signal are obtained by the photodetector 8. The servos 11, 12 and 15 operates so that the error signals may become zero, respectively.

The comparator 18 compares the DC level signal from the DC amplifier 18 with the reference DC level signal from the level signal generator 20. When the pickup head reaches the unrecorded area of the disc, the comparator 18 applies a positive signal to the system controller 14. The system controller 14 controls to immediately stop operations of the servos 11, 12 and 15.

Figure 2:
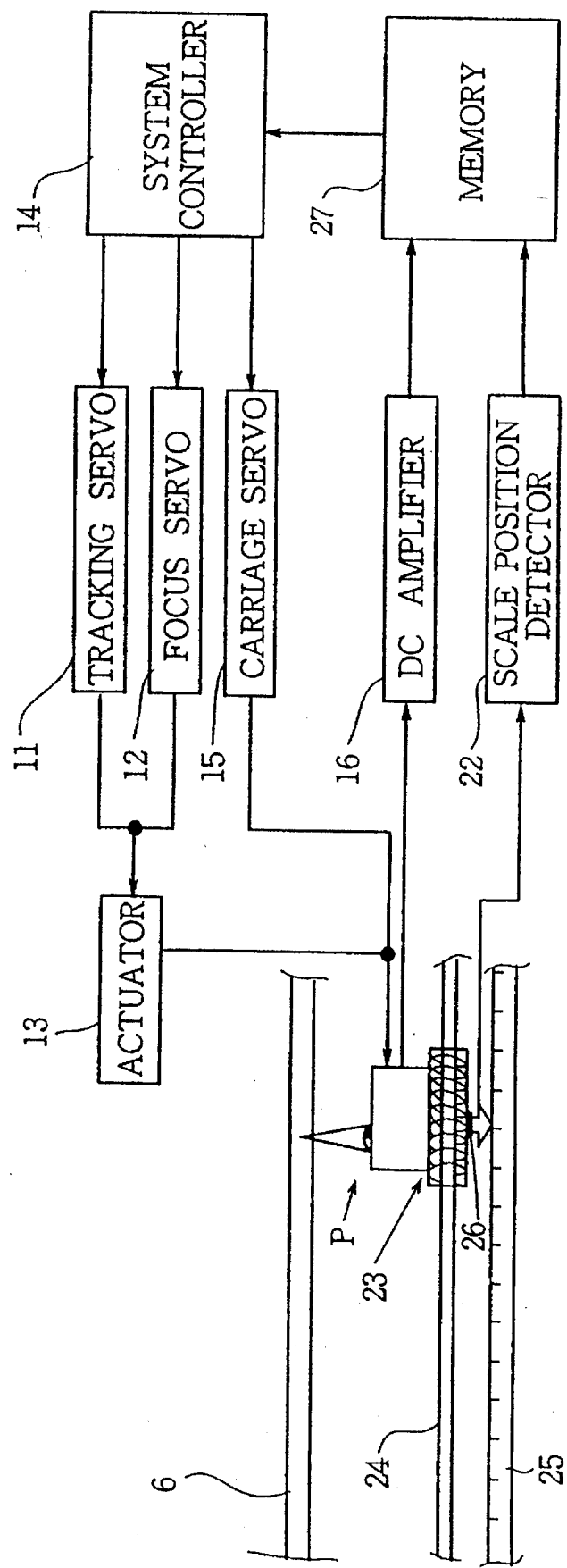
FIG. 2 is a diagram showing a second embodiment of the present invention.

FIG. 2 shows the second embodiment of the optical pickup control system.

The optical pickup of the second embodiment comprises an optical pickup head P supported on a carriage 23, and a guide rail 24 on which the carriage 23 is slidably mounted. Thus, the pickup head P is movable in the radial direction of the disc 6. A scale 25 is provided adjacent and parallel to the guide rail 24 for indicating the radial position of the pickup head P. A magnetic sensor 26 is provided on the underside of the carriage 23 for detecting the position of the pickup head P from the change of the magnetic field. The magnetic sensor 26 produces a position signal which is supplied to a scale position detector 22. The detector 22 detects the position of the pickup head P on the scale 25 in the radial direction of the disc and the detected position is stored in a memory 27.

In place of the magnetic sensor, other sensors such as a photo-sensor may be used. The position is detected in accordance with modulation of light.

Figure 3:
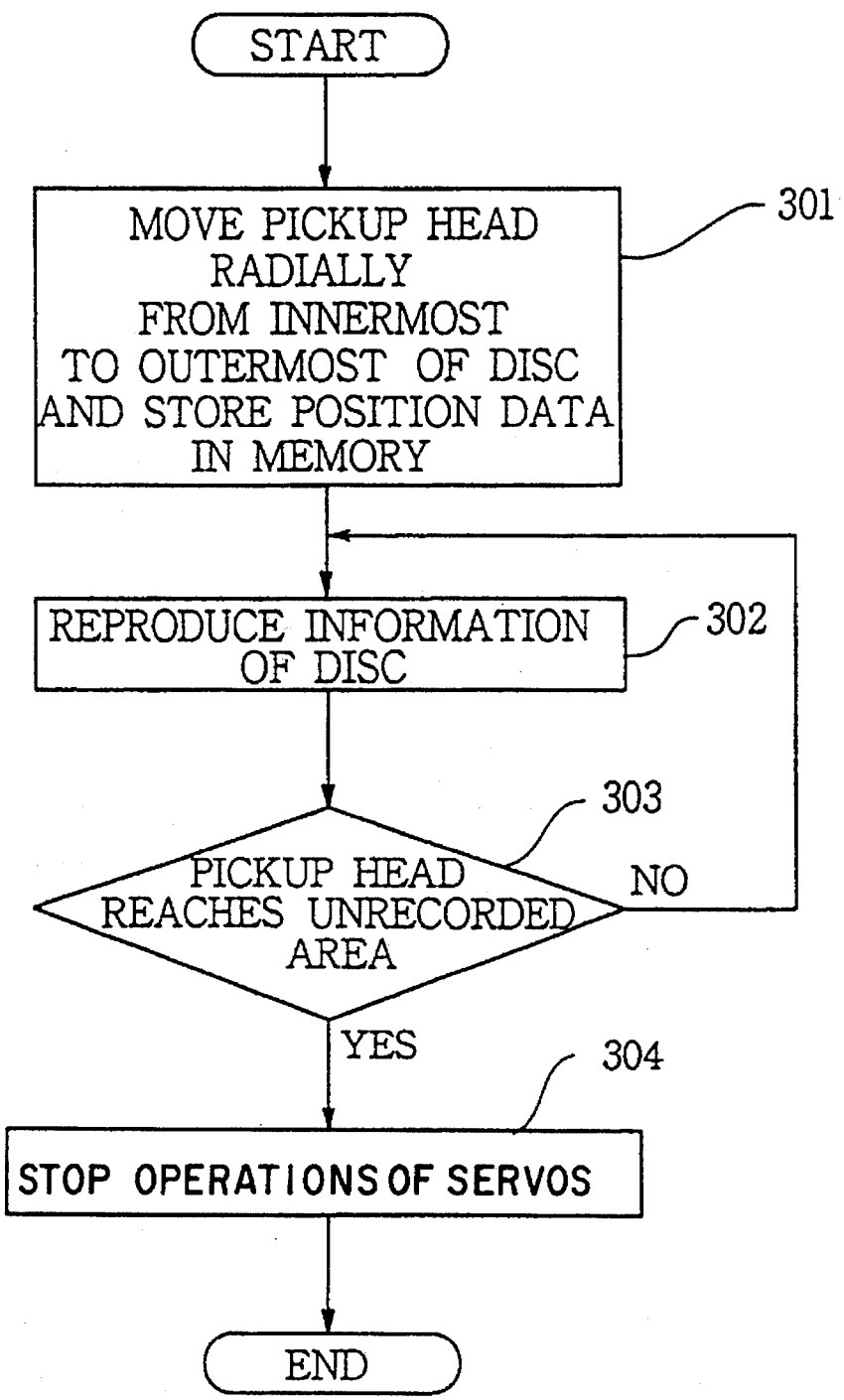
FIG. 3 is a flowchart showing an operation of the second embodiment.

The operation of the system will be described with reference to the flowchart of FIG. 3.

When the optical disc 6 is set on the reproducing position of the player, the system controller 14 produces a control signal which is applied to the carriage servo 15. The carriage servo 15 is operated to move the carriage 23 having the pickup head P in the radial direction of the disc 6 from the innermost position to the outermost position thereof.

During the radial movement, the focus servo 12 is controlled in accordance with a control signal from the controller 14, while the tracking servo 12 is caused to be inoperative. The scale position detector 22 detects the position of the pickup head P based on the position signal from the magnetic sensor 26.

During the radial movement of the pickup head P with the focus operation, when the pickup head P moves from the recorded area into the unrecorded area of the disc, the reflectivity of the reflected light changes, which causes the output of the pickup head to change. The change of the output is applied to the memory 27 through the DC amplifier 16.

On the other hand, the scale position detector 22 applies the position signal at the change of the output to the memory 27, which is stored in the memory as a position data of the unrecorded area (step 301).

The carriage 23 is returned to the innermost position of the disc in accordance with the carriage servo 15 operated by the control signal from the system controller 14. The pickup head P starts to reproduce the information recorded on the disc 6 (step 302). It is determined whether the pickup head disc 6 reaches the unrecorded are or not (step 303). If yes, the system controller 14 controls to stop the operation of the carriage servo 15 as well as the tracking servo 11 and the focus servo 12 (step 304).

Alternatively in the present invention, when the pickup head reaches the unrecorded area, the pickup head may be returned to the recorded area. In another modification, only the tracking servo is turned off and the unrecorded area is indicated for the recording information in the unrecorded area.

In accordance with the present invention, the optical system is provided with a memory for storing data on the recorded area and the unrecorded area of the optical disc. During reproducing the information on the disc, the pickup head is properly controlled based on the data stored in the memory, thereby ensuring the reliability of the player. The unrecorded area can be accurately determined by the system.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An optical pickup control system comprising:
  an optical pickup for producing an output signal for reproducing information recorded on an optical disc;
  a disc type discriminating device for discriminating the type of optical disc and for producing a disc type signal in accordance with a discriminated type;

a memory storing reference values for discriminating change of reflectivity from a recorded area of said information to an unrecorded area for every type of discriminated disc;

a level signal generator, responsive to said disc type signal, for deriving a reference value from said memory for said type of optical disc;

a comparator for comparing a level of said output signal of said optical pickup with a level of said derived reference value, therein determining that said optical pickup has reached said unrecorded area, and for producing a stop signal; and stopping means, responsive to said stop signal, for stopping radial movement of said optical pickup.

2. The system according to claim 1 further comprising a position memory for storing data representing a position where the pickup reaches the unrecorded area.

* * * * *